May 22, 1945. A. E. KARLBERG 2,376,600
SHAFT SEAL
Filed April 17, 1944
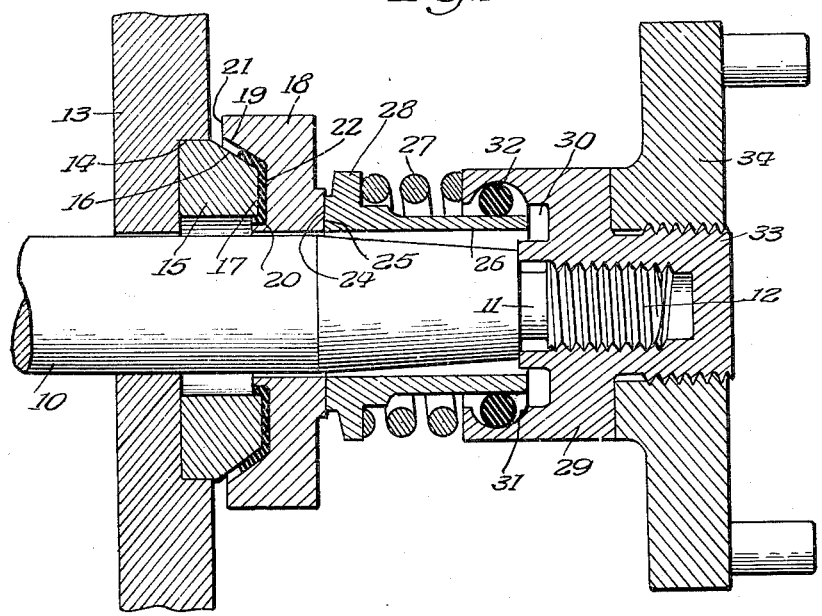
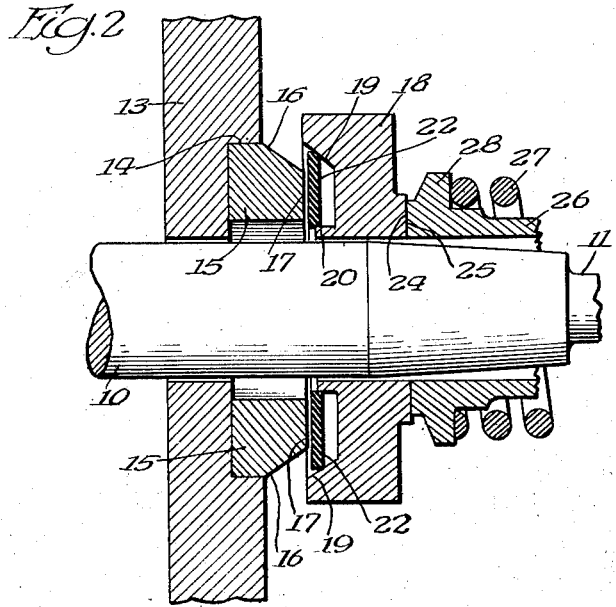
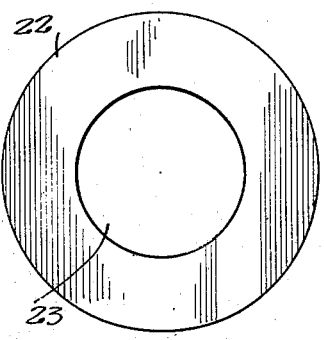
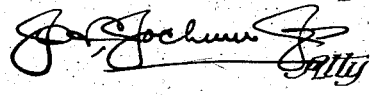
Inventor
Arvid E. Karlberg
By Patented May 22, 1945

2,376,600

UNITED STATES PATENT OFFICE 2,376,600

SHAFT SEAL

Arvid E. Karlberg, Chicago, Ill., assignor to Chicago Seal Co., Chicago, Ill., a corporation of Illinois Application April 17, 1944, Serial No. 531,364

3 Claims. (Cl. 286—7)

This invention relates, in general, to seals for shafts, particularly adapted, though not necessarily limited in use, for sealing rotating shafts which project through a wall or bearing, to prevent escape or leakage of oil or gas, and one of the objects of the invention is to provide an improved seal assembly which may be employed as a replacement or repair unit adapted to be readily applied, and which will not interfere with the free rotation, or other movements, of the shaft.

In my co-pending application, Serial No. 507,241, there is disclosed a similar seal, but such seal necessitates, in its assembly, a specifically pre-formed or shaped gasket, and while the results obtained are very efficient and satisfactory, it has been found that, with the present construction and invention, the cost of production will be materially reduced, without depriving the seal of any of its efficiency.

To the attainment of these ends and the accomplishment of other new and useful objects as will appear, the invention consists in the features of novelty in substantially the construction, combination and arrangement of the several parts, hereinafter more fully described and claimed, and shown in the accompanying drawing illustrating this invention, in which Figure 1 is a view, partly in elevation and partly in section, of a portion of a shaft having a seal constructed in accordance with the principles of this invention, applied thereto.

Figure 2 is a fragmentary view of the parts shown in Figure 1, and showing the elements of the seal in a different position.

Figure 3 is a detail view, in elevation, of the sealing gasket.

In the drawing, the reference numeral 10 designates a portion of a rotatable shaft which is to be sealed, and which may be provided with a reduced end 11 that is threaded, as at 12. The shaft passes through a wall 13, and the wall is preferably formed with a recess 14 encompassing the shaft opening. Seated in the recess is an annular member 15, which is formed of any suitable material and extends for a suitable distance beyond the face of the wall to form a bearing or abutment member, and is provided with a beveled or tapered portion 16 adjacent one end 17 thereof.

The seal assembly is adapted for use as a replacement unit, and is also adapted to be applied without alteration of the shaft. It is also adapted to be initially installed in the apparatus, of which the rotating shaft 10 forms a part.

The seal consists, essentially, of a seal element 18 having a recess opening through one face, the wall 19 of the recess being beveled, while the wall 20 is preferably straight, and this wall 20 preferably terminates within the recess and for a substantial distance from the face 21 of the element 18. The recess is of a width greater than the thickness of the abutment member 15, so that the latter may be seated within the recess.

The numeral 22 designates an annular gasket which is constructed of any suitable material that is adapted to be compressed, and the gasket is, normally, substantially flat and thin. The diameter of the gasket is greater than a portion of the recess bounded by the walls 19—20, and the opening 23 of the gasket is only slightly greater than the peripheral diameter of the wall 20, so that when the gasket is placed within the recess in the element 18, it will assume the position shown in Fig. 2 of the drawing. That is, the outer periphery will rest against the inclined wall 19, while the inner periphery will engage and be supported by the wall 20, the gasket being spaced from the bottom of the recess.

With the parts in this position, and when the member or element 18 is forced toward the wall 13, the end 17 of the bearing member 15 will force the gasket into the recess, to the position shown in Fig. 1. As the gasket is forced into the recess, it will not only assume the shape of the recess, but will be compressed so as to extend over and form a cup-shaped member to receive the end 17 of the bearing member 15, and, at the same time, the wall 20 of the recess will prevent the gasket from being compressed or forced into contact with the rotating shaft. In compressing the gasket in this manner, it will not only form a seal for liquid or fluid, but will frictionally grip the proximate faces of the bearing member 15 and the element 18, and thereby hold the element 18 against rotation with respect to the bearing 15 and the wall 13.

The element 18 is provided with a bearing surface 24, against which a bearing surface 25 of a sleeve 26 that surrounds the shaft 10, has a running contact. The internal diameter of the sleeve 26 is greater than the external diameter of the adjacent portion of the shaft. Encompassing the sleeve is a coil spring 27, one end of which abuts a shoulder 28 of the sleeve, and the other end thereof bears against a fitting 29 that is screwed upon the threaded end 12 of the shaft. The fitting 29 is provided with a recess 30, into which one end of the sleeve 26 projects, and the entrance of the recess is of a diameter considerably greater than the external diameter of the adjacent portion of the sleeve.

Seated within an annular recess 31 in the wall of the opening is an annular resilient gasket or packing 32, which latter forms a seal against the escape of oil or gas that may find its way along the shaft and through the sleeve. By adjustment of the fitting 29 upon the end of the shaft, the stress of the spring 27 may be varied, and as the spring operates to hold the bearing surfaces 24—25 in contact, the degree of friction therebetween may be controlled. The fitting 29 may be provided with a reduced threaded end 33, upon which a coupling member 34 may be secured.

With this construction, it will be manifest that there will not only be formed a perfect seal for the shaft, but the seal will not interfere with the various movements of the shaft which may occur, and operates to compensate any irregularities or lateral movements of the shaft, without rocking or shifting the element 18. At the same time, the element 18 will be held against rotation with respect to the bearing 15, by reason of the friction created by the gasket 22.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A replacement seal for a rotating shaft extending through a bearing opening to be sealed, comprising a washer member having a finished annular surface forming a seal seat on one face and having an open annular recess in the opposite face, one of the walls of said recess tapering toward the axis of the washer member, the opposite wall of the recess being substantially straight, a normally substantially flat thin gasket seated in the recess, the diameter of the gasket being greater than a portion of the cross-sectional dimension of the recess, whereby when the gasket is initially seated in the recess it will be held out of contact with the bottom of the recess, and a bearing member adapted to force the gasket into the recess, whereby to compress the gasket and cause it to encompass and extend over the adjacent end of said bearing member.

2. A replacement seal for a rotating shaft extending through a bearing opening to be sealed, comprising a washer member having a finished annular surface forming a seal seat on one face and having an open annular recess in the opposite face, one of the walls of said recess tapering toward the axis of the washer member, the opposite wall of the recess being substantially straight, a normally substantially flat thin gasket seated in the recess, the diameter of the gasket being greater than a portion of the cross-sectional dimension of the recess, whereby when the gasket is initially seated in the recess it will be held out of contact with the bottom of the recess, a bearing member, and means operating to force the gasket into the recess, whereby to compress the gasket and cause it to encompass and extend over the adjacent end of said bearing member, the wall at the inner periphery of the washer member maintaining the gasket out of contact with said shaft.

3. A replacement seal for a rotating shaft extending through an opening to be sealed, comprising a washer member having a finished annular surface forming a seal seat on one face and having an open recess in the opposite face, said recess varying in cross-sectional dimension throughout substantially the depth of the recess, a normally substantially flat annular gasket of an external diameter greater than a portion of said recess, whereby when said gasket is initially seated in the recess it will be held out of engagement with the bottom of the recess, and a seal element operating to force the gasket against the bottom of the recess, whereby to compress the gasket and cause it to extend over and encompass the adjacent end of the said seal element.

ARVID E. KARLBERG.